United States Patent [19]

Eistert

[11] 4,212,146
[45] Jul. 15, 1980

[54] UNIVERSAL CUTTING AND FEED ASSEMBLY FOR MULTIROW STALK-CROP HARVESTER

[75] Inventor: Theodor Eistert, Neustadt, German Democratic Rep.

[73] Assignee: Veb Kombinat Fortschritt, Neustadt, Sachsen, German Democratic Rep.

[21] Appl. No.: 940,100

[22] Filed: Sep. 6, 1978

[30] Foreign Application Priority Data

Sep. 9, 1977 [DD] German Democratic Rep. ... 200955

[51] Int. Cl.² .................... A01D 45/00; A01D 55/00
[52] U.S. Cl. ......................... 56/98; 56/13.6; 56/295
[58] Field of Search ............... 56/98, 6, 235, 157, 56/295, 13.6

[56] References Cited

U.S. PATENT DOCUMENTS

| | | | |
|---|---|---|---|
| 3,736,733 | 6/1973 | Fell et al. | 56/98 |
| 3,783,533 | 1/1974 | Konig et al. | 56/6 |
| 3,916,725 | 11/1975 | Reber | 56/295 |
| 3,961,466 | 6/1976 | Martin et al. | 56/98 |
| 4,086,748 | 5/1978 | Witt | 56/98 |
| 4,106,270 | 8/1978 | Weigand et al. | 56/98 |
| 4,143,504 | 3/1979 | Noack et al. | 56/98 |

*Primary Examiner*—Paul J. Hirsch
*Attorney, Agent, or Firm*—Karl F. Ross

[57] ABSTRACT

A stalk-crop harvester displaceable along the ground has a plurality of forwardly open throats each adapted to receive a row of the crop during harvesting thereof and having at its front end to one side a cutting rotor and to the other side a sprocket for a conveyor chain extending back along the respective throat. Provided at the front end of each of the throats is one of a plurality of identical mounting plates which are each symmetrical about a respective upright plane bisecting the respective front end and extending generally in the normal direction of displacement of the harvester. Each such plate carries a pair of similar mounts which axially flank the respective plane, and one of which rotatably carries the respective sprocket and the other of which rotatably carries the respective rotor. To this end each of these mounts houses one of a pair of identical shafts which carry at their ends respective rotors that are interconnected by gearing underneath the plate to synchronously counterrotate the two shafts.

10 Claims, 3 Drawing Figures

UNIVERSAL CUTTING AND FEED ASSEMBLY FOR MULTIROW STALK-CROP HARVESTER

FIELD OF THE INVENTION

The present invention relates to a multirow stalk-crop harvester. More particularly this invention concerns a cutter and feed assembly for use in such a harvester.

BACKGROUND OF THE INVENTION

A multirow stalk-crop harvester has a chassis that is displaced along the ground and that has at its front end a plurality of forwardly open throats each adapted to receive a respective row of the crop during harvesting thereof. At the extreme front end relative to the normal direction of travel of the harvester each such throat is provided to one side thereof with a cutting rotor and to the other side thereof with a sprocket over which is spanned a conveyor chain that extends back along the respective throat. The rotor is continuously driven from the sprocket by means of gearing, so that as the machine moves along the ground a crop stalk is grasped at the base and is severed close to the ground. Thereafter the crop stalk is moved back along the throat by means of pushers or entrainment blocks carried on the conveyor chain. The cutting operation is normally carried out by cooperation of a blade fixed at the extreme front end of each throat with a plurality of angularly spaced blades carried on the cutting rotor.

In such a system as described in East German (DDR) patent No. 120,752 a mounting plate is provided at the front end of each of these throats. The cutting rotor, sprocket, and gearing for the respective throat are carried on this mounting plate.

In most systems, however, the sprockets of adjacent throats are on opposite sides of the respective throats. Similarly various throats are inclined relative to the forward direction of travel of the machine. As a result each mounting plate must be specially made for the respective throat, and the various parts must be specially assembled thereon for each separate throat. This type of construction considerably increases the cost of the harvester, and requires a user to stock a multiplicity of different spare parts in order to be able to service the machine. In the event of a simple breakdown due, for example, to a rock wedging between the blades, it is necessary to disassemble the mechanism at the front end of the throat in question, and reassemble it later after replacing or sharpening the damaged blade or blades, taking particular care to tailor the reassembly operation to the particular throat, using those new parts which are necessary for the particular inclination and attitude of the various parts relative to each other.

OBJECTS OF THE INVENTION

It is therefore an object of the present invention to provide an improved row-type crop harvester.

Another object is to provide an improved arrangement for the various parts at the front ends of the throats of such a harvester.

Another object is to provide such a harvester which is easy and inexpensive to produce and maintain.

SUMMARY OF THE INVENTION

These objects are attained according to the instant invention in a multirow stalk-crop harvester of the above-described general type wherein a plurality of substantially identical mounting plates are used, each at the front end of a respective throat. Each plate is generally symmetrical about a respective upright plane bisecting the respective front end and extending along the respective feed channel and generally in the normal direction of displacement of the harvester. Each such plate is provided with a pair of similar mounts symmetrically flanking the respective symmetry plane. The respective cutting rotor is carried on one of these mounts and the respective sprocket is carried on the other mount. A set of gears is also provided on each of the plates which is symmetrical to the respective symmetry plane, these gears interconnecting the respective rotor and sprocket. The device further comprises a pair of substantially identical shafts journaled in each of the mounting plates each in a respective one of the mounts. Each such shaft has a lower end connected to the respective set of gears and an upper end, the rotors and sprockets being mounted on these upper ends.

Thus with the system according to the instant invention a basic assembly is used at the front end of each of the throats. The symmetrical formation of this assembly allows the sprockets and cutting rotors to be mounted on whichever side is necessary for the particular machine. Thus these subassemblies are interchangeable so that servicing is a relatively easy chore and the owner or repair person need not stock a wide variety of replacement parts.

According to further features of this invention each of the plates is formed with a forwardly open cutout defining the front end of the respective throat. A blade is provided at the base of each of these cutouts and the cutting rotor according to this invention need not have sharpened blade formations but can merely orbit a plurality of radially extending and angularly equispaced arms closely above this blade to sever the crop. These arms can be spaced angularly by a distance equal to the spacing between adjacent pusher or entrainment blocks on the conveyor chain, with the sprocket and cutting rotor driven synchronously so that the arms and pushers interleave or mesh.

According to further features of this invention the mounts, which are similar but not identical, are provided with respective flanges that are each formed with a circular array of radially equispaced bores. The spacing between the bores of the two mounts is identical so that it is possible to secure either mount on either side, and also to turn the mounts limitedly depending on the attitude the particular plate is to assume relative to the harvester. It is noted in this context that only the centermost throats extend generally parallel to the transport direction, whereas moving away from these center throats the throats are inclined at increasingly greater angles to the direction of displacement of the machine.

The gears interconnecting the two shafts comprise according to this invention a pair of identical outer gears carried on the lower ends of the shafts, which are equispaced from the above-mentioned symmetry plane, and a pair of inner gears also rotatable about axes symmetrically flanking this plane, and each meshing with a respective outer gear as well as with each other. This insures counterrotation of the cutting rotor and sprocket, and also insures identical angular rotation speed.

Thus in accordance with the invention if the entire mechanism at the front end of a given throat is damaged and rendered useless, a new standard mounting plate can simply be bolted at the front end of the respective throat. Then the cutting rotor is bolted to the shaft to the appropriate side of the respective throat and the sprocket to the outer shaft. Such repairs can be carried out very easily even directly in the field.

SPECIFIC DESCRIPTION

The improvement according to the instant invention relates to the mechanism or assembly at the front end of a cutting and conveyor throat of a stalk-type crop harvester such as described in greater detail in commonly owned patent applications Ser. Nos. 913,233 and 913,234, both filed June 6, 1978. For more details regarding the tension for the conveyor chain of such a system or for the drive for the rear ends of the chains of such a system reference should be made to these applications, whose entire disclosures are herewith incorporated by reference.

Figure 1:
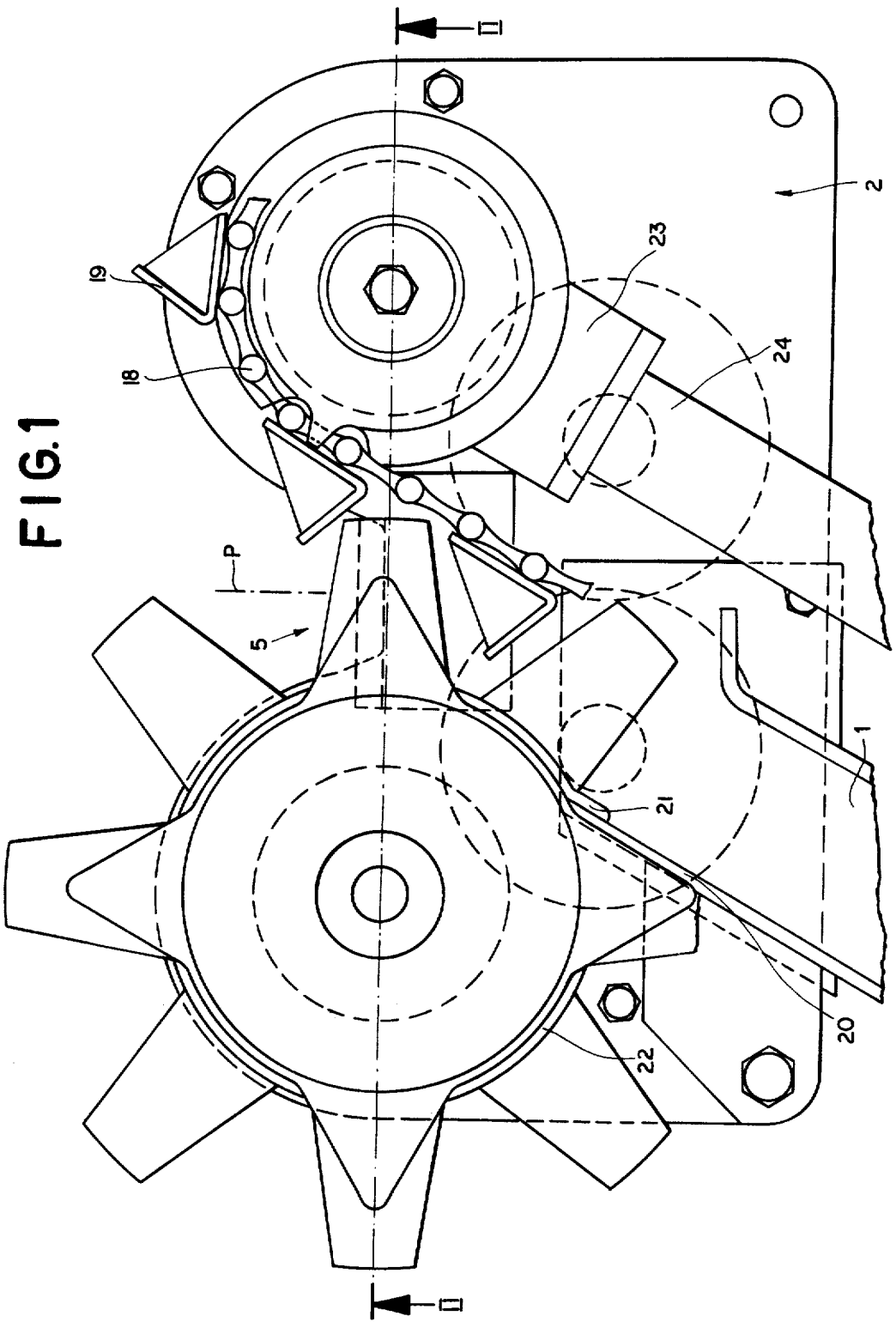
FIG. 1 is a top view of the arrangement according to this invention.
Figure 2:
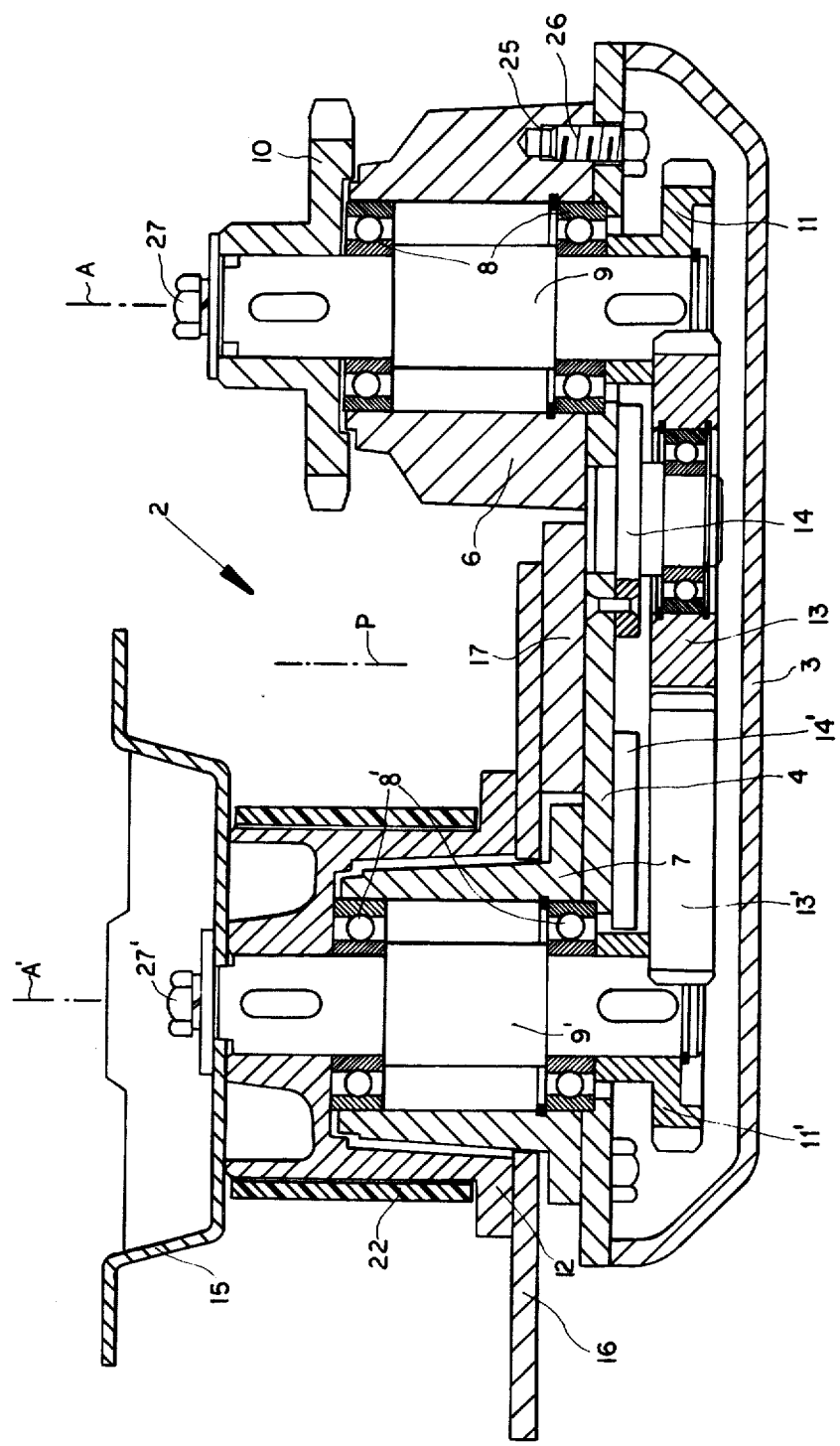
FIG. 2 is a section taken along line II—II of FIG. 1.
Figure 3:
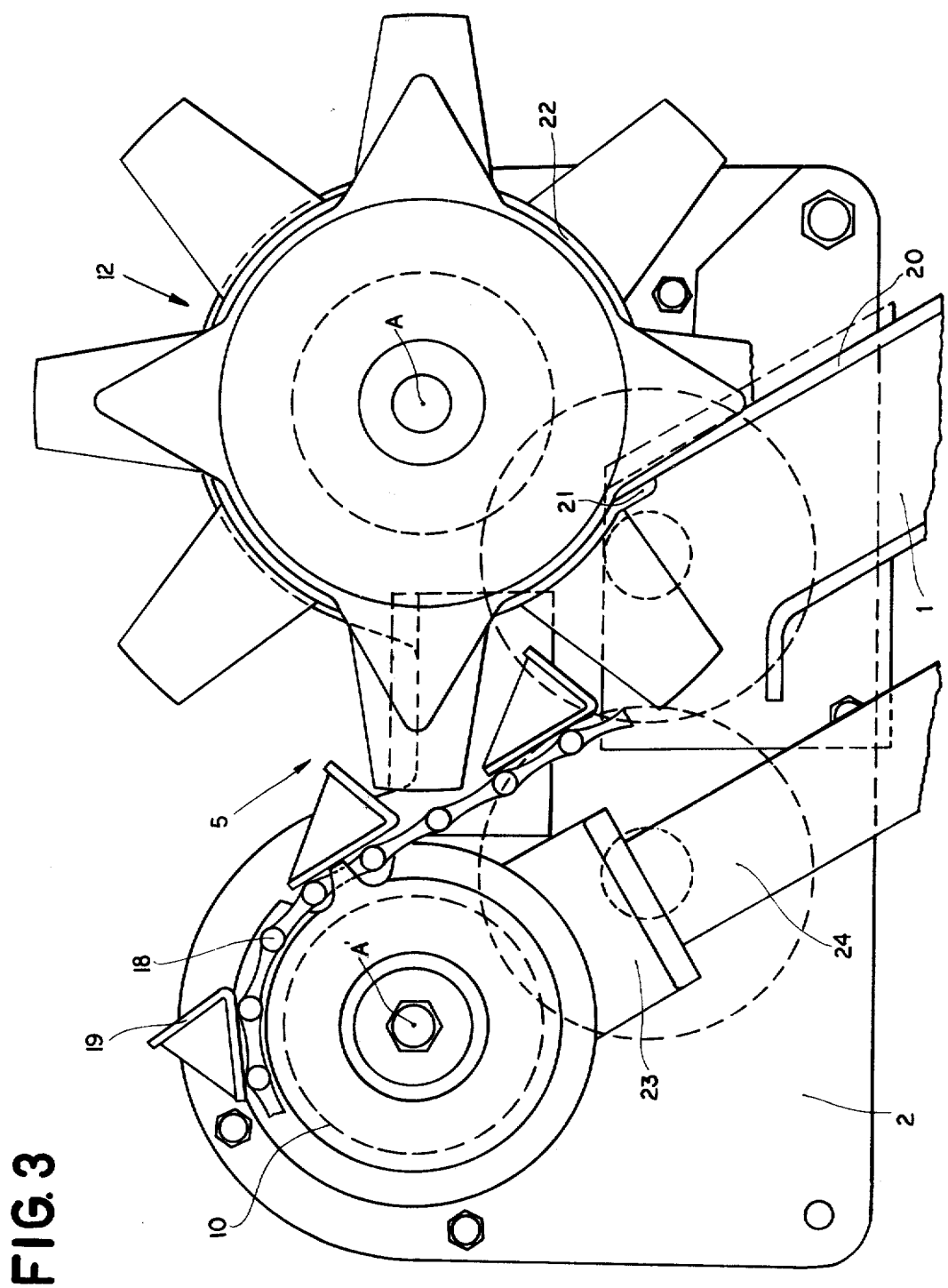
FIG. 3 is a view of the system shown in FIG. 1, but set up for a feed throat that is inclined oppositely.

As shown in FIGS. 1-3, each feed throat 1 of a row-type crop harvester is provided at its front end with an assembly 2 having a housing 3 and a rigid double-lobed mounting plate 4 defining between its two lobes a throat 5, and symmetrical about a plane P bisecting the throat 5. Symmetrically flanking this plane P are two sleeve-type mounts 6 and 7 centered on respective axes A and A' equispaced to opposite sides of and parallel to the plane P. The mounts 6 and 7 are each formed with a circular array of angularly equispaced holes 25 in which engage bolts 26 passing through the plate 4. These mounting sleeves 6 and 7 can therefore be arranged in any of a plurality of angularly offset positions on the plate 4, and in fact the holes 25 of the two mounts 6 and 7 are radially indentically spaced from the respective axes A and A' so that each of the sleeves 6 and 7 can be mounted to either side of the plane P centered on either of the axes A or A'.

Coaxially received within the mounts 6 and 7 are a pair of identical shafts 9 and 9' rotatable in respective roller bearings 8 and 8' and keyed at their lower ends to respective drive pinions 11 and 11'. The one shift 9 in FIG. 2 carries a sprocket 10 and the other shaft 9' carries a cutting rotor 12, both held in place by means of respective axially extending mounting screws 27 and 27'. FIG. 3 shows how the arrangement can be reversed with the cutting rotor 12 mounted on the shaft 9 and the sprocket 10 mounted on the shaft 9'.

The two pinions 11 and 11' are identical, and mesh with respective identical intermediate gears 13 and 13' carried on identical mounts 14 and 14' defining respective axes symmetrically flanking the plane P. Thus the two shafts 9 and 9' will be synchronously and oppositely driven at the same angular speed.

The rotor 12 comprises an upper entrainment or guide starwheel 15 and a plurality of angularly equispaced radially extending arms 16 that are orbital about the axis A' (or A in FIG. 3) immediately above a blade 17 fixed to the plate 4 at the base of the cutout 5 forming the extreme front end of the respective throat. Reeved over the sprocket 10 is a conveyor chain 18 carrying a succession of equispaced pusher or entrainment elements 19 that are spaced apart by a spacing identical to the angular spacing between the arms 16. The spacing and synchronous driving of the sprocket 10 and rotor 12 makes the arms 16 and pushers 19 mesh. They will therefore grasp the lower end of a stalk being harvested and press it against the blade 17 that is downwardly inclined, so as to sever it, and then pass it along into the throat 1 where it will be conveyed backwardly to the chopper of the machine by the elements 19 alone. This chain may be tensioned by means of a cylinder having a piston rod 24 connected to a flange 23 of the mount 6 in the manner described in the first above-cited copending and commonly owned patent application.

Furthermore bolted to the leading edge of the one side 20 of the throat 1 is an end 21 of a synthetic-resin sleeve 22 that surrounds the rotor 12 between the star-wheel 15 and the arms 16, so as to prevent crop from winding around this element. This cylindrical sleeve 22 therefore acts as a shield, and is correspondingly adapted to surround the cylindrical central portion of the cutting rotor 12 with some play.

As is obvious from a comparison of FIGS. 1 and 3 the mounting plate can be used to either side of the center line of the harvester, and can even be set at any inclination relative to the respective throat 1. Therefore in a standard 6- or 8-row harvester a single subassembly is used for the mechanism at the front ends of the throat. As this mechanism is subjected to extreme wear end, even when very ruggedly built, must be frequently serviced, this represents a considerable saving in fabrication cost and maintenance cost.

I claim:

1. In a multirow stalk-crop harvester displaceable along the ground and having a plurality of forwardly open throats are adapted to receive a row of the crop during harvesting thereof and having at the front end of each throat at one side thereof a cutting rotor and to the other side thereof a sprocket for a conveyor chain extending back along the respective throat, the improvement comprising:

a plurality of separate and identical mounting plates each secured to said harvester at the front end of a respective throat, each plate being substantially symmetrical about a respective upright plane bisecting the respective front end and extending generally in the normal direction of displacement of said harvester, each plate defining a pair of axes substantially parallel to and symmetrically flanking the respective plane;

a pair of similar mounts on each of said plates symmetrically flanking the respective plane and centered on the respective axes, the respective cutting rotor being carried on one of the mounts of each pair of mounts for rotation about the respective axis and the respective sprocket being carried on the other mount of the respective pair of mounts for rotation about the respective axis, each of said mounts being securable to the respective plate centered on either of the respective axes; and means including a set of gears on each of said plates symmetrical to the respective plane and interconnecting the respective rotor and sprocket for driving each rotor from the respective sprocket.

2. The improvement defined in claim 1, further comprising a pair of substantially identical shafts journaled in each of said mounting plates each in a respective mount, each shaft having a lower end connected to the respective set of gears and having an upper end, said rotors and sprockets being mounted on said upper ends.

3. The improvement defined in claim 2 wherein each of said plates is formed with a forwardly open cutout defining the front end of the respective throat.

4. The improvement defined in claim 3 wherein each of said plates is provided with a respective blade at the base of the respective cutout, each cutting rotor cooperating with the respective blade.

5. The improvement defined in claim 4 wherein said chains each carry a plurality of regularly spaced entrainment bodies and said cutting rotors each carry a plurality of entrainment formations angularly equispaced at an angular spacing generally equal to the spacing of the entrainment bodies of the respective chain.

6. The improvement defined in claim 2 wherein said shafts of each pair of shafts are rotatable about respective parallel axes flanking the respective plane.

7. The improvement defined in claim 2 wherein each set of gears includes a pair of outer gears each carried on a respective lower end and a pair of meshing inner gears each meshing with a respective outer gear.

8. The improvement defined in claim 7 wherein each pair of inner gears symmetrically flank the respective plane.

9. The improvement defined in claim 1 wherein each of said mounts is a sleeve.

10. The improvement defined in claim 9 wherein said mounts are releasably secured to the respesctive plate and each mount can be secured to the respective plate to both sides of the respective plane.

* * * * *